United States Patent
Otomo et al.

(10) Patent No.: US 8,999,485 B2
(45) Date of Patent: Apr. 7, 2015

(54) CURABLE LIQUID SILICONE RUBBER COMPOSITION FOR FORMING A SEALING MEMBER AND SEALING MEMBER

(75) Inventors: Takayoshi Otomo, Chiba (JP); Keiji Yoshida, Ichihara (JP); Yuji Saito, Ichihara (JP)

(73) Assignee: Dow Corning Toray Co., Ltd., Chiyoda-Ku, Tokyo (JP)

(*) Notice: Subject to any disclaimer, the term of this patent is extended or adjusted under 35 U.S.C. 154(b) by 200 days.

(21) Appl. No.: 13/519,300

(22) PCT Filed: Dec. 28, 2010

(86) PCT No.: PCT/JP2010/073912
§ 371 (c)(1),
(2), (4) Date: Sep. 20, 2012

(87) PCT Pub. No.: WO2011/081233
PCT Pub. Date: Jul. 7, 2011

(65) Prior Publication Data
US 2013/0011606 A1  Jan. 10, 2013

(30) Foreign Application Priority Data
Dec. 29, 2009  (JP) .................................. 2009-299244

(51) Int. Cl.
*C08L 83/07* (2006.01)
*C08L 83/04* (2006.01)
(Continued)

(52) U.S. Cl.
CPC ................. *C08L 83/04* (2013.01); *C08G 77/12* (2013.01); *C08G 77/20* (2013.01); *C08K 3/36* (2013.01)

(58) Field of Classification Search
CPC .......... C08L 83/04; C08K 3/36; C08G 77/20; C08G 77/12

USPC ............ 428/131; 524/862, 268, 588; 525/477
See application file for complete search history.

(56) References Cited

U.S. PATENT DOCUMENTS

| 4,857,564 A | 8/1989 | Maxson |
| 5,668,225 A | 9/1997 | Okazaki et al. |

(Continued)

FOREIGN PATENT DOCUMENTS

| JP | 05-005064 A | 1/1993 |
| JP | 7130424 A | 5/1995 |

(Continued)

OTHER PUBLICATIONS

English language abstract and machine-assisted English translation for JP 05-005064 extracted from the PAJ database on Dec. 12, 2012, 27 pages.

(Continued)

*Primary Examiner* — William P Watkins, III
(74) *Attorney, Agent, or Firm* — Howard & Howard Attorneys PLLC (57) ABSTRACT

A liquid silicone rubber composition comprising an alkenyl group-containing liquid organopolysiloxane, a reinforcing silica filler, an organohydrogenpolysiloxane, a platinum group catalyst, a liquid organopolysiloxane that is free of crosslinking groups and is compatible with the alkenyl group-containing liquid organopolysiloxane, and a liquid organopolysiloxane that is free of crosslinking groups and is incompatible with the alkenyl group-containing liquid organopolysiloxane, wherein the cured material therefrom has a JIS type A durometer hardness of 15 to 26 and a tensile stress at 100% elongation of 0.25 to 0.60 MPa. Also, a through hole-containing sealing member comprising this cured material.

15 Claims, 2 Drawing Sheets

(51) Int. Cl.
*C08G 77/12* (2006.01)
*C08G 77/20* (2006.01)
*C08K 3/36* (2006.01)

(56) References Cited

U.S. PATENT DOCUMENTS 5,883,184 A * 3/1999 Nagaoka .................. 524/788
2002/0188059 A1 12/2002 Otomo

FOREIGN PATENT DOCUMENTS

JP  2002-338809 A  11/2002
JP  2004-075813 A  3/2004

OTHER PUBLICATIONS

English language abstract for JP 7130424 extracted from the espacenet.com database on Dec. 13, 2012, 11 pages.
English language abstract and machine-assisted English translation for JP 2002-338809 extracted from the PAJ database on Dec. 13, 2012, 28 pages.
English language abstract and machine-assisted English translation for JP 2004-075813 extracted from the PAJ database on Dec. 13, 2012, 36 pages.
International Search Report for Application No. PCT/JP2010/073912 dated May 3, 2011, 3 pages.

* cited by examiner

CURABLE LIQUID SILICONE RUBBER COMPOSITION FOR FORMING A SEALING MEMBER AND SEALING MEMBER

RELATED APPLICATIONS

This application is the National Stage of International Patent Application No. PCT/JP2010/073912, filed on Dec. 28, 2010, which claims priority to and all the advantages of Japanese Patent Application No. JP 2009-299244, filed on Dec. 29, 2009.

TECHNICAL FIELD

The present invention relates to a curable liquid silicone rubber composition for forming a through hole-containing sealing member and to a through hole-containing sealing member. More particularly, the present invention relates to a curable liquid silicone rubber composition for forming a through hole-containing sealing member, wherein the curable liquid silicone rubber composition can form a silicone rubber that exhibits excellent sealing properties and an excellent resistance to damage in the vicinity of through holes in the silicone rubber sealing member provided by curing. The present invention also more particularly relates to a through hole-containing sealing member comprising a silicone rubber that exhibits excellent sealing properties and an excellent resistance to damage in the vicinity of the through hole.

BACKGROUND ART

Silicone rubber compositions cure to give silicone rubbers that exhibit a desirable modulus, an excellent heat resistance, an excellent water resistance, and so forth, and for these reasons are used for sealing members such as gaskets, packings, and O-rings. Silicone rubber compositions may be broadly categorized into millable silicone rubber compositions and liquid silicone rubber compositions and into peroxide-curable silicone rubber compositions and addition reaction-curable silicone rubber compositions.

The following have been introduced in pursuit of an improved resistance to lubricating oil: an addition reaction-curable silicone rubber composition that contains a silicone oil and is intended for gasket applications—refer to JP 05-005064 A (Patent Document 1); a sealing element for waterproof connectors, that is produced from a millable silicone rubber containing a phenylsilicone oil—refer to JP 07-130424 A (Patent of silicone oils—refer to P 2002-338809 A (Patent Document 3) and JP 2004-075813 A (Patent Document 4).

The silicone rubber composition described in JP 05-005064 A (Patent Document 1) is intended for application to gaskets that are continually immersed in a lubricating oil, and as a consequence the cured silicone rubber product therefrom has an overly high hardness. As a result, when this silicone rubber composition is molded into a through hole-containing sealing member and, for example, a metal terminal, metal wire, rubber-coated metal wire, or plastic-coated metal wire is repeatedly inserted into the through hole in the air, the silicone rubber around the through hole is prone to become damaged, i.e., an ability to resist damage is not present.

The oil bleeding-type sealing element for waterproof connectors described in JP 07-130424 A (Patent Document 2) comprises a millable silicone rubber that contains a phenylsilicone oil and exhibits an excellent surface lubricity. However, in the case of a through hole-containing sealing element, the insertion of, for example, a metal terminal, metal wire, rubber-coated metal wire, or plastic-coated metal wire into the through hole readily causes damage to the silicone rubber around the through hole, i.e., a poor ability to resist damage is exhibited.

The oil bleeding-type silicone rubber compositions described in JP 2002-338809 A (Patent Document 3) and JP 2004-075813 A (Patent Document 4) provide cured silicone rubber products that exhibit an excellent surface lubricity. However, when these silicone rubber compositions are molded into a through hole-containing sealing member and, for example, a metal wire, rubber-coated metal wire, or plastic-coated metal wire is repeatedly inserted into the through hole, the silicone rubber around the through hole is prone to become damaged, i.e., the ability to resist damage is inadequate.

When the silicone rubber around a through hole becomes damaged, water, dust, and contaminated air can then easily infiltrate through the damaged area, which results in a reduced sealing performance.

SUMMARY OF THE INVENTION

Problems to be Solved by the Invention

The present inventors achieved the present invention as a result of intensive investigations directed to solving the problems identified above. That is, an object of the present invention is to provide a curable liquid silicone rubber composition for forming a sealing member, wherein the curable liquid silicone rubber composition can form a silicone rubber that exhibits excellent handling characteristics, an excellent sealing performance against water, dust, and contaminated air, and an excellent resistance to damage in the vicinity of through holes, i.e., through-holes in the silicone rubber sealing member provided by curing.

An additional object of the present invention is to provide a through hole-containing sealing member comprising a silicone rubber that exhibits an excellent resistance to damage in the vicinity of the through hole, i.e., through-hole, excellent handling properties, and an excellent sealing performance against water, dust, and contaminated air.

An additional object of the present invention is to provide a method of manufacturing the aforementioned through hole-containing sealing member.

Means Solving the Problems

The problems cited above are solved by

"[1] A curable liquid silicone rubber composition for forming a through hole-containing sealing member, characterized in that the curable liquid silicone rubber composition comprises
(A) 100 weight parts of a liquid organopolysiloxane that is represented by the average unit formula: $R_aSiO_{(4-a)/2}$ wherein R is an unsubstituted monovalent hydrocarbyl group or a halogenated monovalent hydrocarbyl group and a is 1.95 to 2.05, that contains at least two silicon-bonded alkenyl groups in each molecule, and that has a viscosity at 25° C. of 100 to 100,000 mPa·s;
(B) 10 to 100 weight parts of a reinforcing silica filler;
(C) an organohydrogenpolysiloxane that has at least two hydrosilyl groups in each molecule, in an amount that provides (1.0:1) to (3.0:1) for the ratio between the number of moles of hydrosilyl groups in this component and the number of moles of alkenyl groups in component (A);
(D) a platinum group catalyst, in a catalytic amount;

(E) a liquid organopolysiloxane that does not contain an aliphatically unsaturated group, hydrosilyl group, and silanol group, that has a viscosity at 25° C. of 10 to 500,000 mPa·s, and that is compatible with component (A), in an amount that is 15 to 31 weight % of the total of components (A) to (F); and (F) a liquid organopolysiloxane that does not contain an aliphatically unsaturated group, hydrosilyl group, and silanol group, that has a viscosity at 25° C. of 10 to 500,000 mPa·s, and that is incompatible with component (A), in an amount that is 1.0 to 10 weight % of the total of components (A) to (F), wherein the cured material therefrom has a hardness, measured using a type A durometer according to JIS K 6253, "Hardness Test Method for Vulcanized Rubbers", of 15 to 26 and has a tensile stress at 100% elongation, measured according to JIS K 6251, "Vulcanized Rubbers and Thermoplastic Rubbers—Determination of Tensile Properties", of 0.25 to 0.60 MPa.

[1-1] A use of the curable liquid silicone rubber composition comprising component (A) through component (F) defined in [1] as a starting material of a through hole-containing sealing member that has a hardness, measured using a type A durometer according to JIS K 6253, "Hardness Test Method for Vulcanized Rubbers", of 15 to 26 and has a tensile stress at 100% elongation, measured according to JIS K 6251, "Vulcanized Rubbers and Thermoplastic Rubbers—Determination of Tensile Properties", of 0.25 to 0.60 MPa.

[1-2] The curable liquid silicone rubber composition for forming a through hole-containing sealing member according to [1], characterized in that the curable liquid silicone rubber composition contains component (B) in an amount of 20 to 65 weight parts per 100 weight parts of component (A).

[2] The curable liquid silicone rubber composition for forming a through hole-containing sealing member according to [1], characterized in that the curable liquid silicone rubber composition comprises a liquid silicone rubber base provided by mixing 100 weight parts of component (A) with 10 to 100 weight parts of component (B) with the application of heat, and components (C), (D), (E), and (F) in the amounts specified in [1].

[2-1] The curable liquid silicone rubber composition for forming a through hole-containing sealing member according to [2], characterized in that the composition comprises a liquid silicone rubber base provided by mixing 100 weight parts of component (A) with 20 to 65 weight parts of component (B).

[3] The curable liquid silicone rubber composition for forming a through hole-containing sealing member according to [1], characterized in that the composition comprises a liquid silicone rubber base provided by mixing (100-X) weight parts of component (A) with 10 to 100 weight parts of component (B) with the application of heat, X weight parts of component (A), and components (C), (D), (E), and (F) in the amounts specified in [1], wherein X is from 0 (but not including 0) to 30.

[4] The curable liquid silicone rubber composition for forming a through hole-containing sealing member according to [1], [2], or [3], characterized in that the non-alkenyl silicon-bonded groups in the organopolysiloxane (A) are methyl groups, the silicon-bonded groups other than silicon-bonded hydrogen atoms in the organohydrogenpolysiloxane (C) are methyl groups, the organopolysiloxane (E) is a dimethylpolysiloxane, and the silicon-bonded groups in the organopolysiloxane (F) are methyl groups and phenyl groups.

[5] The curable liquid silicone rubber composition for forming a through hole-containing sealing member according to [1], [2], or [3], characterized in that the silicone rubber has a tensile strength of at least 2.8 MPa and an elongation of at least 500% in each case as measured according to JIS K 6251, "Tensile Test Methods for Vulcanized Rubbers".

The problems cited above are also solved by

"[6] A through hole-containing sealing member, characterized in that the through hole-containing sealing member comprises a silicone rubber provided by curing a curable liquid silicone rubber composition comprising (A) 100 weight parts of a liquid organopolysiloxane that is represented by the average unit formula: $R_aSiO_{(4-a)/2}$ wherein R is an unsubstituted monovalent hydrocarbyl group or a halogenated monovalent hydrocarbyl group and a is 1.95 to 2.05, that contains at least two silicon-bonded alkenyl groups in each molecule, and that has a viscosity at 25° C. of 100 to 100,000 mPa·s;

(B) 10 to 100 weight parts of a reinforcing silica filler;

(C) an organohydrogenpolysiloxane that has at least two hydrosilyl groups in each molecule, in an amount that provides (1.0:1) to (3.0:1) for the ratio between the number of moles of hydrosilyl groups in this component and the number of moles of alkenyl groups in component (A);

(D) a platinum group catalyst, in a catalytic amount;

(E) a liquid organopolysiloxane that does not contain an aliphatically unsaturated group, hydrosilyl group, and silanol group, that has a viscosity at 25° C. of 10 to 100,000 mPa·s, and that is compatible with component (A), in an amount that is 15 to 31 weight % of the total of components (A) to (F); and (F) a liquid organopolysiloxane that does not contain an aliphatically unsaturated group, hydrosilyl group, and silanol group, that has a viscosity at 25° C. of 10 to 100,000 mPa·s, and that is incompatible with component (A), in an amount that is 1.0 to 10 weight % of the total of components (A) to (F), wherein this silicone rubber has a hardness, measured using a type A durometer according to JIS K 6253, "Hardness Test Method for Vulcanized Rubbers", of 15 to 26 and has a tensile stress at 100% elongation, measured according to JIS K 6251, "Vulcanized Rubbers and Thermoplastic Rubbers—Determination of Tensile Properties", of 0.25 to 0.60 MPa.

[6-1] The through hole-containing sealing member according to [6], characterized in that the composition contains component (B) in an amount of 20 to 65 weight parts per 100 weight parts of component (A).

[6-2] The through hole-containing sealing member according to [6] or [6-1], characterized in that the silicone rubber has a tensile strength of at least 2.8 MPa and an elongation of at least 500% in each case as measured according to JIS K 6251, "Tensile Test Methods for Vulcanized Rubbers.

[7] The through hole-containing sealing member according to [6], characterized in that the composition comprises a liquid silicone rubber base provided by mixing 100 weight parts of component (A) with 10 to 100 weight parts of component (B) with the application of heat, and components (C), (D), (E), and (F) in the amounts specified in [6]

[7-1] The through hole-containing sealing member according to [7], characterized in that the composition comprises a liquid silicone rubber base provided by mixing 100 weight parts of component (A) with 20 to 65 weight parts of component (B).

[8] The through hole-containing sealing member according to [6], characterized in that the composition comprises a liquid silicone rubber base provided by mixing (100-X) weight parts of component (A) with 10 to 100 weight parts of component (B) with the application of heat, X weight parts of component (A), and components (C), (D), (E), and (F) in the amounts specified in [5], wherein X is from 0 (but not including 0) to 30.

[9] The through hole-containing sealing member according to [6], [7], or [8], characterized in that the non-alkenyl silicon-bonded groups in the organopolysiloxane (A) are methyl groups, the silicon-bonded groups other than silicon-bonded hydrogen atoms in the organohydrogenpolysiloxane (C) are methyl groups, the organopolysiloxane (E) is a dimethylpolysiloxane, and the silicon-bonded groups in the organopolysiloxane (F) are methyl groups and phenyl groups.

[10] The through hole-containing sealing member according to claim [6], [7], or [8], characterized in that the silicone rubber has a tensile strength of at least 2.8 MPa and an elongation of at least 500% in each case as measured according to JIS K 6251, "Tensile Test Methods for Vulcanized Rubbers".

[1,1] Method of manufacturing the through hole-containing sealing member according to [6], characterized in that the liquid silicone rubber composition is filled into a metal mold having a cavity and having at least one pin in the cavity thickness direction, the metal mold is hot pressed, and the resulting through hole-containing sealing member made of a silicone rubber is taken out from the metal mold".

Effects of the Invention

The curable liquid silicone rubber composition according to the present invention for forming a through hole-containing sealing member can form a silicone rubber sealing member that exhibits excellent handling characteristics, an excellent sealing performance against water, dust, and contaminated air and particularly against water, and an excellent resistance to damage around through holes, i.e., through-holes (for example, the inner wall, entrance opening, and exit opening of the through hole) in the silicone rubber sealing member provided by curing.

The through hole-containing sealing member of the present invention exhibits an excellent resistance to damage around through holes, i.e., through-holes (for example, the inner wall, entrance opening, and exit opening of the through hole), excellent handling properties, excellent support for the operation of inserting an element or member into the through hole, i.e., through-holes and removing the element or member therefrom, and an excellent sealing performance against water, dust, and contaminated air and particularly with respect to water.

MODE(S) FOR CARRYING OUT THE INVENTION

The curable liquid silicone rubber composition according to the present invention for forming a through hole-containing sealing member will be described in detail. This curable liquid silicone rubber composition comprises (A) 100 weight parts of a liquid organopolysiloxane that is represented by the average unit formula: $R_a SiO_{(4-a)/2}$ wherein R is an unsubstituted monovalent hydrocarbyl group or a halogenated monovalent hydrocarbyl group and a is 1.95 to 2.05, that contains at least two silicon-bonded alkenyl groups in each molecule, and that has a viscosity at 25° C. of 100 to 100,000 mP·s;

(B) 10 to 100 weight parts of a reinforcing silica filler;

(C) an organohydrogenpolysiloxane that has at least two hydrosilyl groups in each molecule, in an amount that provides (1.0:1) to (3.0:1) for the ratio between the number of moles of hydrosilyl groups in this component and the number of moles of alkenyl groups in component (A);

(D) a platinum group catalyst, in a catalytic amount;

(E) a liquid organopolysiloxane that does not contain an aliphatically unsaturated group, hydrosilyl group, and silanol group, that has a viscosity at 25° C. of 10 to 500,000 mPa·s, and that is compatible with component (A), in an amount that is 15 to 31 weight % of the total of components (A) to (F); and (F) a liquid organopolysiloxane that does not contain an aliphatically unsaturated group, hydrosilyl group, and silanol group, that has a viscosity at 25° C. of 10 to 500,000 mPa·s, and that is incompatible with component (A), in an amount that is 1.0 to 10 weight % of the total of components (A) to (F), wherein the cured material therefrom has a hardness, measured using a type A durometer according to JIS K 6253, "Hardness Test Method for Vulcanized Rubbers", of 15 to 26 and has a tensile stress at 100% elongation, measured according to JIS K 6251, "Vulcanized Rubbers and Thermoplastic Rubbers—Determination of Tensile Properties", of 0.25 to 0.60 MPa.

The base component of the composition of the present invention is the liquid organopolysiloxane (A) that is represented by the average unit formula: $R_a SiO_{(4-a)/2}$ wherein R is an unsubstituted monovalent hydrocarbyl group or a halogenated monovalent hydrocarbyl group and a is 1.95 to 2.05, that contains at least two silicon-bonded alkenyl groups in each molecule, and that has a viscosity at 25° C. of 100 to 100,000 mPa·s. The alkenyl groups in this liquid organopolysiloxane (A) undergo a hydrosilylation reaction with the silicon-bonded hydrogen atoms in the organohydrogenpolysiloxane (C), i.e., it cures by crosslinking through an addition reaction. The curable liquid silicone rubber composition according to the present invention is hydrosilylation reaction-curable.

This alkenyl group can be exemplified by vinyl, allyl, butenyl, pentenyl, and hexenyl, and is preferably vinyl from the standpoints of ease of production and reactivity in the hydrosilylation reaction.

The silicon-bonded organic groups in component (A) other than the silicon-bonded alkenyl groups can be exemplified by alkyl groups such as methyl, ethyl, propyl, and so forth; aryl groups such as phenyl, tolyl, and so forth; and halogenated alkyl groups such as 3,3,3-trifluoropropyl and so forth. Viewed from the standpoint of ease of production, methyl is preferably at least 50 mol % and more preferably is 100 mol % of these non-alkenyl silicon-bonded organic groups.

The molecular structure of component (A) can be, for example, straight chain, partially branched straight chain, or branched chain, with straight chain and partially branched straight chain being preferred.

Component (A) has a viscosity at 25° C. of 100 to 100,000 mPa·s, and, viewed from the standpoint of the molding processability of the silicone rubber composition, preferably has a viscosity at 25° C. in the range from 500 to 50,000 mPa·s.

This liquid organopolysiloxane (A) can be exemplified by dimethylpolysiloxanes endblocked at both molecular chain terminals by dimethylvinylsiloxy groups; dimethylsiloxane.methylvinylsiloxane copolymers endblocked at both molecular chain terminals by dimethylvinylsiloxy groups; dimethylsiloxane.methylvinylsiloxane copolymers endblocked at both molecular chain terminals by trimethylsiloxy groups; partially branched straight-chain organopolysiloxanes comprising the siloxane unit represented by the formula $(CH_3)_2(CH_2=CH)SiO_{1/2}$, the siloxane unit represented by the formula $(CH_3)_2SiO_{2/2}$, and the siloxane unit represented by the formula $(CH_3)SiO_{3/2}$; organopolysiloxanes as provided by replacing a portion of the methyl groups in the preceding organopolysiloxanes with any selection from, for example, non-methyl alkyl groups such as ethyl, propyl, and so forth, aryl groups such as phenyl, tolyl, and so forth, and halogenated alkyl groups such as 3,3,3-trifluoropropyl and so forth; organopolysiloxanes as provided by replacing all or a portion of the vinyl groups in the preceding organopolysiloxanes with an alkenyl group other than vinyl, for example, allyl, propenyl, and so forth; and mixtures of two or more of the preceding organopolysiloxanes.

The reinforcing silica filler (B) functions to improve the viscosity of the mixture of components (A) and (C) and to improve the mechanical strength of the cured silicone rubber product. This is typically a fumed silica, also known as dry-process silica, or a precipitated silica, also known as a wet-process silica, also known as precipitated silica. Fumed silica and wet-process silica—and particularly fumed silica—have a substantial viscosity-raising activity and for this reason are preferably hydrophobed using an organosilicon compound, for example, trimethylchlorosilane, dimethyldichlorosilane, hexamethyldisilazane, and octamethylcyclotetrasiloxane. Hydrophobing may also be performed during mixing with component (A).

The BET specific surface area of the reinforcing silica filler (B) is preferably 100 to 400 $m^2/g$ in order to secure a satisfactory improvement in the mechanical strength of the resulting silicone rubber.

The curable liquid silicone rubber composition for forming a through hole-containing sealing member contains component (B) in an amount of 10 to 100 weight parts, preferably 20 to 65 weight parts per 100 weight parts of component (A), that is, component (B) is incorporated in an amount of 10 to 100 weight parts, preferably 20 to 65 weight parts per 100 weight parts of component (A) in the composition of the present invention.

The organohydrogenpolysiloxane (C) is a crosslinking agent for component (A) and brings about crosslinking of component (A) by the addition reaction between the silicon-bonded hydrogen atoms in this organohydrogenpolysiloxane and the at least two alkenyl groups in component (A).

Component (C) has at least two silicon-bonded hydrogen atoms in each molecule, but must contain at least three silicon-bonded hydrogen atoms when component (A) has two silicon-bonded alkenyl groups:

The silicon-bonded organic groups in component (C) can be exemplified by alkyl groups such as methyl, ethyl, propyl, and so forth; aryl groups such as phenyl, tolyl, and so forth; and halogenated alkyl groups such as 3,3,3-trifluoropropyl and so forth. Viewed from the standpoints of ease of production and the compatibility with component (A), methyl groups are preferably at least 50 mol % and more preferably is 100 mol % of the silicon: bonded organic groups in component (C).

The molecular structure of component (C) can be exemplified by straight chain, partially branched straight chain, branched chain, network, and dendritic, wherein straight chain, partially branched straight chain, and branched chain are preferred. Component (C) preferably has a viscosity at 25° C. in the range from 1 to 1,000 mPa·s.

The organohydrogenpolysiloxane (C) can be exemplified by dimethylpolysiloxanes endblocked by dimethylhydrogensiloxy groups at both molecular chain terminals; methylhydrogenpolysiloxanes endblocked by trimethylsiloxy groups at both molecular chain terminals; dimethylsiloxane.methylhydrogensiloxane copolymers endblocked by trimethylsiloxy groups at both molecular chain terminals; cyclic methylhydrogenpolysiloxanes; tris(dimethylhydrogensiloxy)methylsilane; tetra(dimethylhydrogensiloxy)silane; partially branched organohydrogenpolysiloxanes comprising the siloxane unit represented by the formula $(CH_3)_2HSiO_{1/2}$, the siloxane unit represented by the formula $(CH_3)_2SiO_{2/2}$, and the siloxane unit represented by the formula $(CH_3)SiO_{3/2}$; and branched organohydrogenpolysiloxanes comprising the siloxane unit represented by the formula $(CH_3)_2HSiO_{1/2}$ and the siloxane unit represented by the formula $SiO_{4/2}$. When component (A) is an organopolysiloxane in which the non-alkenyl silicon-bonded groups are methyl groups, viewed from a compatibility standpoint component (C) is preferably an organohydrogenpolysiloxane in which silicon-bonded groups other than the silicon-bonded hydrogen atoms are methyl groups.

Additional examples are organohydrogenpolysiloxanes generated by replacing a portion of the methyl groups in the preceding organohydrogenpolysiloxanes with any selection from non-methyl alkyl groups such as ethyl, propyl, and so forth; aryl groups such as phenyl, tolyl, and so forth; and halogenated alkyl groups such as 3,3,3-trifluoropropyl and so forth. Other examples are mixtures of two or more of the preceding organohydrogenpolysiloxanes.

Component (C) is incorporated in the composition of the present invention in an amount that provides from 1.0 to 3.0 moles and preferably from 1.0 to 2.0 moles silicon-bonded hydrogen atoms in component (C) per 1 mole of the alkenyl groups in component (A).

The reasons for this are as follows: when the quantity of component (C) incorporation is less than the lower limit for the range indicated above, the resulting silicone rubber composition tends to undergo an unsatisfactory cure; when, on the other hand, the upper limit for the range indicated above is exceeded, the resulting silicone rubber will exhibit strong adhesion to a mold or die and a compression set for the silicone rubber sealing member yielded by curing tends to increase.

The platinum group catalyst (D) is a catalyst that promotes the hydrosilylation reaction between the silicon-bonded hydrogen atoms in component (C) and the silicon-bonded alkenyl groups in component (A) and thereby promotes the cure of the composition of the present invention.

Platinum-based catalysts can be exemplified by platinum-based catalysts such as chloroplatinic acid, alcohol-modified chloroplatinic acid, olefin complexes of chloroplatinic acid, complexes between chloroplatinic acid and a β-diketone, complexes between platinum and an alkenylsiloxane, platinum tetrachloride, finely divided platinum, solid platinum supported on a support such as alumina or silica, platinum black, olefin complexes of platinum, carbonyl complexes of platinum, and so forth, and by the powder of a thermoplastic organic resin, e.g., methyl methacrylate resin, polycarbonate resin, polystyrene resin, silicone resin, and so forth, that incorporates a platinum-based catalyst as described in the preceding. Rhodium-based catalysts and palladium-based catalysts are other examples of the platinum group catalyst (D).

Component (D) is incorporated in the composition of the present invention in a catalytic amount, i.e., component (D) is incorporated in an amount sufficient to bring about the cure of the composition of the present invention, but its quantity of incorporation is not otherwise particularly limited. Viewed from the perspective of cure acceleration, the quantity of component (D) incorporation is preferably a quantity that provides from 0.1 to 500 weight parts of platinum metal per 1,000,000 weight parts of the composition of the present invention.

Component (E), a liquid organopolysiloxane that does not contain an aliphatically unsaturated group, hydrosilyl group, and silanol group, that has a viscosity at 25° C. of 10 to 500,000 mPa·s, and that is compatible with component (A), functions to improve the damage resistance around the through hole in the sealing member comprising the cured silicone rubber product from the composition of the present invention.

Component (E) is non-crosslinking or non-crosslinkable because it does not contain in its molecule an aliphatically unsaturated group, silicon-bonded hydrogen atom, and silicon-bonded hydroxyl group, i.e., silanol group, that is, because it does not contain in its molecule all groups consisting of an aliphatically unsaturated group, silicon-bonded hydrogen atom, and silicon-bonded hydroxyl group. This aliphatically unsaturated group encompasses both alkenyl groups and alkynyl groups.

Compatibility by component (E) with component (A) can be confirmed by no generation of turbidity immediately after the two components have been mixed at ambient temperature and by no separation into two phases after long-term standing at ambient temperature. Since component (E) is compatible with component (A), component (E) remains in a dispersed state in the silicone rubber for long periods and is thus able to continue to manifest its functional effects.

The silicon-bonded organic groups in component (E) can be exemplified by alkyl groups such as methyl, ethyl, propyl, and so forth; aryl groups such as phenyl, tolyl, and so forth; and halogenated alkyl groups such as 3,3,3-trifluoropropyl and so forth. When component (A) is an organopolysiloxane in which non-alkenyl silicon-bonded groups are methyl groups, from a compatibility standpoint the silicon-bonded organic groups in component (E) are preferably alkyl groups and particularly preferably are methyl groups. When component (A) is an alkenyl-functional dimethylsiloxane.methylphenylsiloxane copolymer, from a compatibility standpoint the silicon-bonded organic groups in component (E) are preferably methyl groups and phenyl groups.

The molecular structure of component (E) can be exemplified by straight chain, partially branched straight chain, branched chain, and cyclic.

Component (E) is a liquid at ambient temperature and has a viscosity at 25° C. in the range from 10 to 500,000 mPa·s and preferably in the range from 25 to 250,000 mPa·s. The reasons for this are as follows: when component (E) has a viscosity below the lower limit on the indicated range, it will then be prone to volatize from the resulting silicone rubber; when, on the other hand, the upper limit on the indicated range is exceeded, the trend of an increasing compression set will appear in the resulting silicone rubber.

The organopolysiloxane (E) can be exemplified by dimethylpolysiloxanes endblocked by trimethylsiloxy groups at both molecular chain terminals; methylalkyl(excluding methyl)polysiloxanes endblocked by trimethylsiloxy groups at both molecular chain terminals; dimethylsiloxane.methylalkyl(excluding methyl)siloxane copolymers endblocked by trimethylsiloxy groups at both molecular chain terminals; partially branched straight-chain organopolysiloxanes comprising the siloxane unit represented by the formula $(CH_3)_3SiO_{1/2}$, the siloxane unit represented by the formula $(CH_3)_2SiO_{2/2}$, and the siloxane unit represented by the formula $(CH_3)SiO_{3/2}$; dimethylsiloxane.methylphenylsiloxane copolymers endblocked by trimethylsiloxy groups at both molecular chain terminals; dimethylsiloxane diphenylsiloxane copolymers endblocked by trimethylsiloxy groups at both molecular chain terminals; dimethylpolysiloxane endblocked by dimethylphenylsiloxy groups at both molecular chain terminals; dimethylsiloxane.methylphenylsiloxane copolymers endblocked by dimethylphenylsiloxy groups at both molecular chain terminals; and mixtures of two or more of the preceding organopolysiloxanes.

Component (E) is incorporated in the composition of the present invention in an amount in the range from 15 to 31 weight % and preferably in the range from 18 to 28 weight %, in each case with respect to the total quantity of components (A), (B), (C), and (E). The reasons for this are as follows: when the quantity of component (E) incorporation is below the lower limit on the indicated range, a trend of declining resistance to damage around the through hole in the silicone rubber sealing member will occur; when, on the other hand, the upper limit on the indicated range is exceeded, a trend of declining mechanical strength and declining tensile modulus for the silicone rubber product will occur, and a trend of declining sealing performance against water, dust, and contaminated air will occur. The previously indicated quantities of component (E) incorporation may not be equal to 10 or less than 10 weight parts per 100 weight parts of component (A).

Component (F), a liquid organopolysiloxane that does not contain an aliphatically unsaturated group, hydrosilyl group, and silanol group, that has a viscosity at 25° C. of 10 to 500,000 mPa·s, and that is incompatible with component (A), is non-crosslinking or non-crosslinkable because it does not contain in its molecule all groups consisting of an aliphatically unsaturated group, silicon-bonded hydrogen atom, and silicon-bonded hydroxyl group, and as a consequence gradually bleeds out from the silicone rubber provided by curing the composition of the present invention and thereby functions to reduce the tack of the silicone rubber surface and improve handling characteristics.

Incompatibility between component (F) and component (A) can be confirmed by the generation of turbidity immediately after the two components have been mixed at ambient temperature or by separation into two phases after long-term standing at ambient temperature.

The silicon-bonded organic groups in component (F) can be exemplified by alkyl groups such as methyl, ethyl, propyl, and so forth; aryl groups such as phenyl, tolyl, and so forth; and halogenated alkyl groups such as 3,3,3-trifluoropropyl and so forth. When component (A) is a methylalkenylpolysiloxane, from an incompatibility standpoint the silicon-bonded organic groups in component (F) are preferably phenyl groups and halogenated alkyl groups.

When component (A) is an alkenyl-functional dimethylsiloxane.methylphenylsiloxane copolymer, from an incompatibility standpoint the silicon-bonded organic groups in component (F) are preferably alkyl groups and particularly preferably are methyl groups.

The organopolysiloxane (F) can be exemplified by dimethylsiloxane.methylphenylsiloxane copolymers endblocked by trimethylsiloxy groups at both molecular chain terminals; dimethylsiloxane.diphenylsiloxane copolymers endblocked by trimethylsiloxy groups at both molecular chain terminals; dimethylpolysiloxane endblocked by dimethylphenylsiloxy groups at both molecular chain terminals; dimethylsiloxane.methylphenylsiloxane copolymers endblocked at both molecular chain terminals by dimethylphenylsiloxy groups; dimethylsiloxane.methyl(3,3,3-trifluoropropyl)siloxane copolymers endblocked at both molecular chain terminals by trimethylsiloxy groups; methyl(3,3,3-trifluoropropyl)polysiloxane endblocked at both molecular chain terminals by trimethylsiloxy groups; and mixtures of two or more of the preceding organopolysiloxanes.

Additional examples are dimethylpolysiloxanes endblocked at both molecular chain terminals by trimethylsiloxy groups; methylalkyl(excluding methyl)polysiloxanes endblocked at both molecular chain terminals by trimethylsiloxy groups; dimethylsiloxane.methylalkyl excluding methyl)siloxane copolymers endblocked at both molecular chain terminals by trimethylsiloxy groups; partially branched straight-chain organopolysiloxanes in which the silicon-bonded groups other than silicon-bonded hydrogen atoms are methyl groups, and comprising the siloxane unit represented by the formula $(CH_3)_3SiO_{1/2}$, the siloxane unit represented by the formula $(CH_3)_2SiO_{2/2}$, and the siloxane unit represented by the formula $(CH_3)SiO_{3/2}$; and mixtures of two or more of the preceding organopolysiloxanes.

Component (F) is incorporated at from 1.0 to 10 weight % of the sum total of components (A), (B), (C), and (F).

When the quantity of component (F) incorporation is less than 1.0%, a trend of declining resistance to damage around the through hole in the silicone rubber sealing member, a trend of declining handling characteristics by the silicone rubber sealing member, and/or a trend of declining insertability/removability by a member into/from the through hole of the silicone rubber sealing member will occur. When 10 weight % is exceeded, a trend of declining-mechanical strength of the silicone rubber provided by curing the inventive composition will occur.

In addition to the previously described essential components, the composition of the present invention preferably contains (G) a hydrosilylation reaction inhibitor in order to improve the storage stability by inhibiting gelation and curing at ambient temperatures and in order to make the inventive composition curable upon the application of heat. This hydrosilylation reaction inhibitor can be exemplified by acetylenic compounds, ene-yne compounds, organonitrogen compounds, organophosphorus compounds, and oxime compounds.

Specific examples are alkynyl alcohols such as 3-methyl-1-butyn-3-ol, 3,5-dimethyl-1-hexyn-3-ol, 3-methyl-1-pentyn-3-ol, phenylbutynol, 1-ethynyl-1-cyclohexanol, and so forth; ene-yne compounds such as 3-methyl-3-penten-1-yne, 3,5-dimethyl-1-hexyn-3-ene, and so forth; and benzotriazole and methylvinylcyclosiloxane.

The quantity of incorporation for this hydrosilylation reaction inhibitor is generally in the range from 0.001 to 5, 100 weight parts of component (A) and is preferably in the range from 0.01 to 2 weight parts per 100 weight parts of component (A). However, the quantity of incorporation of the hydrosilylation reaction inhibitor should be selected as appropriate in conformity with the type of hydrosilylation reaction inhibitor, the properties and content of the hydrosilylation reaction catalyst, the quantity of alkenyl groups in component (A), and the quantity of silicon-bonded hydrogen atoms in component (C).

The composition of the present invention may contain other optional components insofar as the objects and advantageous effects of the present invention are not impaired. These optional components can be exemplified by inorganic extender fillers such quartz powder, diatomaceous earth, aluminum oxide, aluminosilicate, calcium carbonate, and so forth; fillers as provided by treating the surface of an inorganic extender filler with an organosilicon compound; pigments such as iron oxide red, titanium white, and carbon black; agents that improve the compression set, e.g., copper phthalocyanine, chlorinated copper phthalocyanine, and so forth; agents that impart heat resistance, e.g., rare-earth oxides, rare-earth hydroxides, cerium silanolate, and cerium fatty acid salts; flame retardants; agents that impart thermal conductivity; agents that impart electroconductivity; and adhesion promoters.

There are no limitations on the method of producing the composition of the present invention, and this composition can be produced by mixing components (A) to (F) to uniformity or by mixing components (A) to (F) and optional components to uniformity.

Alternatively, the composition of the present invention can be prepared by first preparing a liquid silicone rubber base by mixing components (A) and (B) with the application of heat and by then mixing this liquid silicone rubber base to uniformity with components (C) to (F). Or, preparation can be carried out by mixing the liquid silicone rubber base to uniformity with component (A) and components (C) to (F). That is, a liquid silicone rubber base can be produced by mixing (100-X) weight parts of component (A) with 10 to 100 weight parts of component (B) with the application of heat and the composition can then be prepared by mixing this liquid silicone base to uniformity with components (C), (D), (E), and (F) in the amounts specified in claim 1 and X weight parts of component (A) wherein X is from 0 to 30 not including 0.

When component (B) is a hydrophilic reinforcing silica, preparation of the liquid silicone rubber base by mixing components (A) and (B) with the application of heat is preferably carried out with the addition thereinto of an organosilicon compound hydrophobing agent in order to subject the surface of component (B) to an in situ hydrophobing treatment. This organosilicon compound hydrophobing agent can be exemplified by a diorganooligosiloxane endblocked by silanol groups at both terminals, an organoalkoxysilane, a hexaorganodisilazane, trimethylchlorosilane, dimethyldichlorosilane, hexamethyldisiloxane, and octamethylcyclotetrasiloxane.

The composition of the present invention can be cured using the usual curing conditions used for curing liquid silicone rubber compositions. The silicone rubber sealing member can be molded by heating the composition of the present invention, for example, for 15 minutes to several minutes at 50 to 250° C. using a prescribed die or mold and a known molding method, e.g., compression molding, injection molding, transfer molding, and so forth. The mold or die is preferably designed to mold, for example, a sheet, slab, disk, and so forth, in each case that has at least one through hole.

In case of compression molding, the through hole-containing sealing member of the present invention can be manufactured by filling the aforementioned liquid silicone rubber composition into a metal mold having a cavity and having at least one pin in the cavity thickness direction, hot pressing the metal mold, and taking out the resulting through hole-containing sealing member made of the silicone rubber.

The cavity has a shape being suitable for shaping a sheet, slab, square plate, circular disk, and so forth. The cavity has preferably two or more pins, and, for example, 4, 9, 16, 25, 36, or 49 pins. The shape of each pin cross section should be the same as the cross section of each through hole. Generally, the pin has a circular to approximately circular cross section.

The cured silicone rubber product from the liquid silicone rubber composition according to the present invention characteristically has a hardness, measured using a type A durometer according to JIS K 6253, "Hardness Test Method for Vulcanized Rubbers", of 15 to 26 and a tensile stress at 100% elongation, measured according to JIS K 6251, "Vulcanized Rubbers and Thermoplastic Rubbers—Determination of Tensile Properties", of 0.25 to 0.60 MPa.

When the type A durometer hardness is less than 15 or the tensile stress at 100% elongation is less than 0.25 MPa, a satisfactory sealing performance is not obtained because the stress required for sealing is not fulfilled.

When, on the other hand, the type A durometer hardness exceeds 26 or the tensile stress at 100% elongation exceeds 0.6 MPa, there is a reduction in the resistance to damage around the through hole in the sealing member.

A type A durometer hardness of 15 according to JIS K 6253, "Hardness Test Method for Vulcanized Rubbers", approximately corresponds to a hardness of 31 measured using an Asker type C rubber hardness meter according to Standard SRIS 0101 of the Society of the Rubber Industry, Japan.

The silicone rubber sealing member provided by curing exhibits an excellent resistance to damage in and around the through hole, i.e., through-holes precisely because this sealing member contains components (E) and (F) in the specified quantities and has the properties indicated above. A metal terminal, metal wire, rubber coated metal wire, plastic-coated metal wire, and so forth, can be easily inserted into this through hole, i.e., through-holes, while the silicone rubber sealing member also resists scratching and damage in and around the through hole, for example, the inner wall, entrance, and exit of the through hole, during repetitive insertion and withdrawal. As a consequence, the infiltration of water, dust, and contaminated air via the through hole opening and along the inserted element is inhibited and an excellent sealing performance is obtained against the preceding and particularly against water.

The presence of these functional effects is even more advantageous in those instances in which the through holes are present in large number in a dense configuration. In addition, because the surface of the silicone rubber sealing member lacks tack, insertion or intercalation between other members and intercalation into various devices are easily performed and the insertability/withdrawability of a member into/from the through holes is also excellent. That is, the assembly workability is excellent.

Accordingly, the sealing member according to the present invention is useful as a sealing member for, e.g., electrical devices and equipment, electrical components, electronic devices and equipment, electronic components, and so forth, where waterproofness is required, as are used in, for example, automobiles, vehicles, ships, aircraft, and so forth.

Viewed from the standpoints of handling characteristics and moldability of the through hole-containing sealing member, this cured silicone rubber product from the curable liquid silicone rubber composition according to the present invention preferably has a tensile strength of at least 2.8 MPa and an elongation of at least 500%, more preferably has a tensile strength of at least 3.0 MPa and an elongation of 500 to 1000%, and most preferably has a tensile strength of at least 3.0 MPa and an elongation of 570 to 900%, in each case as measured according to JIS K 6251, "Tensile Test Methods for Vulcanized Rubbers".

From the standpoint of use as a sealing member, this silicone rubber preferably has a compression set, as measured by the test method described in the examples, of not more than 35%.

The through hole-containing sealing member of the present invention is described below.

This through hole-containing sealing member of the present invention is formed by curing the previously described curable liquid silicone rubber composition comprising component (A) through component (F) for forming a through hole-containing sealing member of the present invention.

This through hole-containing sealing member of the present invention comprises a silicone rubber obtained by curing the previously described curable liquid silicone rubber composition comprising component (A) through component (F). This silicone rubber contains (E) approximately 15 to 31 weight % of a liquid organopolysiloxane that does not contain an aliphatically unsaturated group, hydrosilyl group, and silanol group, that has a viscosity at 25° C. of 10 to 500,000 mPa·s, and that is compatible with component (A) and (F) approximately 1.0 to 10 weight % of a liquid organopolysiloxane that does not contain an aliphatically unsaturated group, hydrosilyl group, and silanol group, that has a viscosity at 25° C. of 10 to 500,000 mPa·s, and that is incompatible with component (A), and has a hardness, measured using a type A durometer according to JIS K 6253, "Hardness Test Method for Vulcanized Rubbers", of 15 to 26 and a tensile stress at 100% elongation, measured according to JIS K 6251, "Vulcanized Rubbers and Thermoplastic Rubbers—Determination of Tensile Properties", of 0.25 to 0.60 MPa.

When the type A durometer hardness is less than 15 or the tensile stress at 100% elongation is less than 0.25 MPa, a satisfactory sealing performance or capability is not obtained because the stress required for sealing is not fulfilled. When, on the other hand, the type A durometer hardness exceeds 26 or the tensile stress at 100% elongation exceeds 0.6 MPa, the resistance to damage in and around the through hole in the sealing member is reduced.

Viewed from the standpoint of preventing damage during molding of the through hole-containing sealing member, this cured silicone rubber product from the liquid silicone rubber composition according to the present invention preferably has a tensile strength of at least 2.8 MPa and an elongation of at least 500%, more preferably has a tensile strength of at least 3.0 MPa and an elongation of 500 to 1000%, and most preferably has a tensile strength of at least 3.0 MPa and an elongation of 570 to 900%, in each case as measured according to JIS K 6251, "Tensile Test Methods for Vulcanized Rubbers".

A type A durometer hardness of 15 according to JIS K 6253, "Hardness Test Method for Vulcanized Rubbers", approximately corresponds to a hardness of 31 as measured by using an Asker type C rubber hardness meter according to Standard SRIS 0101 of the Society of the Rubber Industry, Japan.

From the standpoint of use as a sealing member, this silicone rubber preferably has a compression set, as measured by the test method described in the examples, of not more than 35%.

The through hole-containing sealing member described hereinabove, because it contains the two types of liquid organopolysiloxane in the prescribed quantities and has the specific indicated properties, supports facile insertion and withdrawal while resisting damage in and around the through hole—for example, the inner wall, entrance, and exit of the through hole—when, for example, a metal wire, plastic-coated metal wire, rubber-coated metal wire, and so forth, with a somewhat larger diameter than the diameter of the through hole is inserted into and withdrawn from the through hole a large number of times. This through hole-containing sealing member is thereby able to maintain a long-term sealing performance against water, dust, and contaminated air and particularly against water.

The presence of these functional effects is even more advantageous in those instances in which the through holes are present in large number in a dense configuration.

In addition, because the surface of the silicone rubber sealing member lacks tack, insertion or intercalation between other members and intercalation into various devices are easily performed and the insertability/withdrawability of a member into/from the through holes is also excellent. That is, the assembly workability is excellent.

Accordingly, this through hole-containing sealing member is useful as a sealing member, i.e., a seal, a sealing means, sealing element, for, e.g., electrical devices and equipment, electrical components, electronic devices and equipment, electronic components, and so forth, where waterproofness is required, as are used in, for example, automobiles, vehicles, ships, aircraft, and so forth.

With regard to shape, this through hole-containing sealing member may be, for example, a sheet, slab, mat, pad, square plate, circular disk, and so forth. At least one through hole is present across its thickness, and at least two through holes are preferred, for example, 4, 9, 16, 25, 36, and 49. The shape of the through hole cross section should be the same or approximately the same as the cross section of the, for example, metal wire, rubber-coated metal wire, or plastic-coated metal wire that will be inserted into the through hole, but is not otherwise particularly limited. Generally, however, the through hole has a circular to approximately circular cross section.

The through hole-containing sealing member of the present invention is used in applications where immersion in an oil, for example, a lubricating oil or engine oil, does not occur. Water, dust, and contaminated air and particularly water are typical targets of the sealing action.

EXAMPLES

Examples and comparative examples will be used to provide a detailed description of the inventive curable liquid silicone rubber composition for forming a through hole-containing sealing member and a detailed description of the through hole-containing sealing member of the present invention, which exhibits an excellent resistance to damage in and around the through hole as well as an excellent sealing performance versus water, dust, and contaminated air. The present invention, however, is not limited by the examples.

The viscosity reported in the Examples and Comparative Examples is the value at 25° C., while "parts" in the Examples and Comparative Examples denotes "weight parts". The % value given in parentheses after the dimethylpolysiloxane endblocked by trimethylsiloxy groups at both terminals indicates the % content of this trimethylsiloxy-endblocked dimethylpolysiloxane in the total of components (A) to (F). The % value given in parentheses after the dimethylsiloxane.methylphenylsiloxane copolymer endblocked by trimethylsiloxy groups at both terminals likewise indicates the % content of this trimethylsiloxy-endblocked dimethylsiloxane.methylphenylsiloxane copolymer in the total of components (A) to (F).

The following were used to measure the properties of the silicone rubbers provided by curing the liquid silicone rubber compositions and the resistance to damage around the through hole by the silicone rubber sealing members provided by curing the liquid silicone rubber compositions.

Molding of Silicone Rubber Sheet

The liquid silicone rubber composition was cast into a steel mold that had a square cavity with a thickness of 2 mm and a length of 100 mm along a side; press curing was performed for 10 minutes at 150° C. to obtain a 2 mm-thick silicone rubber sheet;

Type A Durometer Hardness

The hardness was measured on the aforementioned silicone rubber sheet according to the "Hardness Test Method for Vulcanized Rubbers" of JIS K 6253 using a type A durometer hardness meter.

Asker C Hardness

The hardness was measured on the aforementioned silicone rubber sheet according to Standard SRIS 0101 of the Society of the Rubber Industry, Japan, using an Asker type C rubber hardness meter.

Tensile Strength and Elongation

Operating in accordance with JIS K 6251, "Tensile Test Methods for Vulcanized Rubbers", a #3 dumbbell test specimen was punched from the aforementioned silicone rubber sheet and the tensile strength and elongation at rupture were measured.

Tear Strength

Operating in accordance with JIS K 6252, "Tear Test Method for Vulcanized Rubbers", a crescent-shaped test specimen was punched from the aforementioned silicone rubber sheet; a notch was introduced; and the tear strength was measured.

Tensile Modulus

Operating in accordance with JIS K 6251, "Vulcanized Rubbers and Thermoplastic Rubbers—Determination of Tensile Properties", a #3 dumbbell test specimen was punched from the aforementioned silicone rubber sheet and the tensile stress at 100% elongation was measured. M100 is used to represent the tensile stress at 100% elongation.

Compression Set

The compression set was measured in accordance with JIS K 6262, "Compression Set Test Method for Vulcanized Rubbers". Thus, the compression set measurement test specimen stipulated in JIS K 6249 was fabricated by curing the liquid silicone rubber composition for 10 minutes at 170° C. After this, the compression set was measured by the method stipulated in JIS K 6249 using compression of the test specimen for 22 hours at 175° C. and a compression rate of 25%.

Resistance to Damage around Through Hole of Silicone Rubber Sealing Member Molding of Silicone Rubber Sealing Member The liquid silicone rubber composition was filled into a steel mold having a square cavity with a thickness of 4 mm and a length of 20 mm along a side and having a centrally located cylindrical pin with a diameter of 0.7 mm and a length of 4 mm in the thickness direction. Curing was performed by hot pressing at a pressure of 20 MPa for 2 minutes at 110° C. The cured product was a square silicone rubber sealing member that had a thickness of 4 mm, a length of 20 mm along a side, and a single cylindrical through hole with a diameter of 0.7 mm.

Hollow Square Column in Traverse/Withdraw Test

Figure 2:
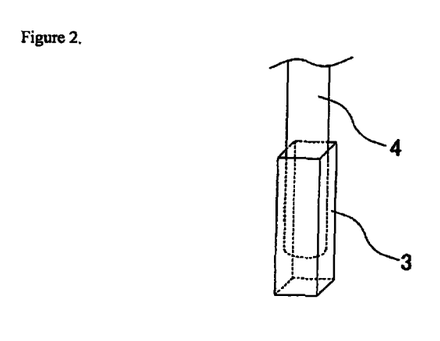
FIG. 2 is a drawing in side view of a hollow square column 3 fitted with a round metal bar 4, for use in the traverse/withdraw test in the Examples of the present invention and the Comparative examples.

A hollow square column 3 was fabricated by bending a 0.3 mm-thick steel sheet. This hollow square column 3 had a square cross section with a length of 2.5 mm on a side and had a length of 8 mm, and the 2.5 mm-by-2.5 mm square end was open. The hollow square column 3 was fixed at the end of a metal bar 4 that had a diameter of 1.9 mm and was then used in the traverse/withdraw test.

Traverse/Withdraw Test

Figure 1:
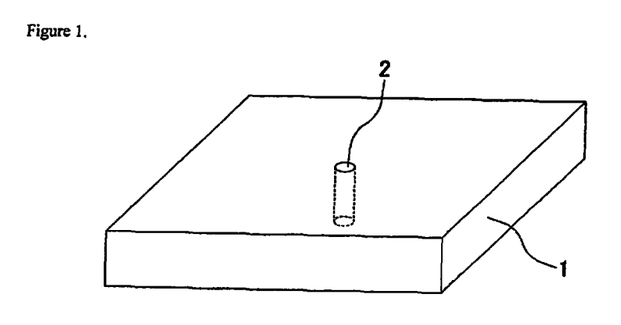
FIG. 1 is a drawing in side view of a through hole-containing sealing member for use in the traverse/withdraw test in the Examples of the present invention.
Figure 3:
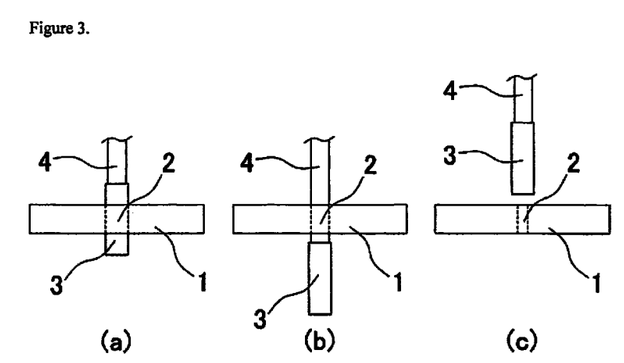
FIG. 3(a) is a drawing that shows the state in the traverse/withdraw test in which the hollow square column 3 has been inserted into a through hole 2 in a sealing member 1.
FIG. 3(b) is a drawing that shows the state in which the hollow square column 3 has traversed the through hole 2 in the traverse/withdraw test.
FIG. 3(c) shows the state after removal of the hollow square column 3 from the through hole 2 in the traverse/withdraw test.

The hollow square column 3 for the traverse/withdraw test (refer to FIG. 2) was inserted vertically along the longitudinal axis into the 0.7 mm-diameter cylindrical through hole 2 (refer to FIG. 1) in the silicone rubber sealing member and, after its complete traverse therethrough, the hollow square column 3 for the traverse/withdraw test was withdrawn vertically along the longitudinal axis of the through hole (refer to FIG. 3). One cycle was designated as extending from insertion up to and including withdrawal. After the prescribed number of traverses and withdrawals, the silicone rubber sealing member 1 was sectioned with a razor along the axial direction of the through hole 2 and the depth of the scratching produced by the traverse and withdrawal was observed using a digital microscope; the depth of the scratching was measured at the location at which the deepest scratching occurred. The table reports the depth of scratching (average value) after the traverse/withdraw test had been run 5 times, 10 times, 15 times, and 20 times.

Reference Example 1

Production of Liquid Silicone Rubber Base A

The following components were mixed to uniformity in a planetary mixer: 100 parts of a dimethylpolysiloxane endblocked by dimethylvinylsiloxy groups at both terminals and having a viscosity of 50,000 mPa·s and a vinyl content of 0.08 weight %, 53 parts of wet-process silica having a specific surface area of 200 $m^2/g$, 12 parts of hexamethyldisilazane, and 2.4 parts of water. This was followed by treatment by heating for 2 hours at 170° C. while mixing to produce a liquid silicone rubber base A. This liquid silicone rubber base A contained 61 weight % of the dimethylvinylsiloxy-endblocked dimethylpolysiloxane and 39 weight % of hydrophobed silica.

Reference Example 2

Production of Liquid Silicone Rubber Base

The following components were mixed to uniformity in a planetary mixer: 100 parts of a dimethylpolysiloxane endblocked by dimethylvinylsiloxy groups at both terminals and having a viscosity of 50,000 mPa·s and a vinyl content of 0.08 weight %, 40 parts of dry-process silica having a specific surface area of 280 $m^2/g$, 7 parts of hexamethyldisilazane, 0.2 part of dimethylsiloxane.methylvinylsiloxane copolymer endblocked by dimethylhydroxysiloxy groups at both terminals and having a viscosity of 20 mPa·s and a vinyl content of 11 weight %, and 2 parts of water. This was followed by treatment by heating for 1 hour at 170° C. while mixing to produce a liquid silicone rubber base B. This liquid silicone rubber base B contained 68 weight % of the dimethylvinylsiloxy-endblocked dimethylpolysiloxane and 32 weight % of hydrophobed silica.

Reference Example 3

Production of Liquid Silicone Rubber Base C

The following components were mixed to uniformity in a planetary mixer: 100 parts of a dimethylpolysiloxane endblocked by dimethylvinylsiloxy groups at both terminals and having a viscosity of 50,000 mPa·s and a vinyl content of 0.08 weight %, 47 parts of dry-process silica having a specific surface area of 380 $m^2/g$, 9 parts of hexamethyldisilazane, 0.2 part of tetramethyldivinyldisilazane, and 1.8 parts of water. This was followed by treatment by heating for 1 hour at 170° C. to produce a liquid silicone rubber base C. This liquid silicone rubber base C contained 64 weight % of the dimethylvinylsiloxy-endblocked dimethylpolysiloxane and 36 weight % of hydrophobed silica.

Example 1

The following components were added to 133 parts of liquid silicone rubber base A and mixed therewith to uniformity in a planetary mixer to produce a hydrosilylation reaction-curable liquid silicone rubber composition designated as composition number 1: 15 parts of a dimethylpolysiloxane endblocked by dimethylvinylsiloxy groups at both terminals and having a viscosity of 50,000 mPa·s; a dimethylpolysiloxane endblocked by trimethylsiloxy groups at both terminals and having a viscosity of 5,000 mPa·s (24%); a dimethylsiloxane.methylphenylsiloxane copolymer endblocked by trimethylsiloxy groups at both terminals and having a viscosity of 150 mPa·s and containing 60 mol % dimethylsiloxane unit and 40 mol % methylphenylsiloxane unit (6%); 2.6 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.005 part of a platinum complex of chloroplatinic acid and divinyltetramethyldisiloxane wherein the platinum concentration in the platinum complex was 41 weight %; and 0.11 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 1.

Example 2

The following components were added to 156 parts of liquid silicone rubber base A and mixed therewith to uniformity in a planetary mixer to produce a hydrosilylation reaction-curable liquid silicone rubber composition designated as composition number 2:
a dimethylpolysiloxane endblocked by trimethylsiloxy groups at both terminals and having a viscosity of 5,000 mPa·s (26%); a dimethylsiloxane.methylphenylsiloxane copolymer endblocked by trimethylsiloxy groups at both terminals and having a viscosity of 150 mPa·s and containing 40 mol % methylphenylsiloxane unit (6%); 2.8 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.005 part of a platinum complex of chloroplatinic acid and divinyltetramethyldisiloxane wherein the platinum concentration in the platinum complex was 41 weight %; and 0.12 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 1.

Comparative Example 1

The following components were added to 156 parts of liquid silicone rubber base A and mixed therewith to uniformity in a planetary mixer to produce a hydrosilylation reaction-curable liquid silicone rubber composition designated as composition number 3:
a dimethylpolysiloxane endblocked by trimethylsiloxy groups at both terminals and having a viscosity of 5,000 mPa·s (15%); a dimethylsiloxane.methylphenylsiloxane copolymer endblocked by trimethylsiloxy groups at both terminals and having a viscosity of 150 mPa·s and containing 40 mol % methylphenylsiloxane unit (4%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.005 part of a platinum complex of chloroplatinic acid and divinyltetramethyldisiloxane wherein the platinum concentration in the platinum complex was 41 weight %; and 0.1 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 1.

Comparative Example 2

The following components were added to 156 parts of liquid silicone rubber base A and mixed therewith to uniformity in a planetary mixer to produce a hydrosilylation reaction-curable liquid silicone rubber composition designated as composition number 4:
a dimethylpolysiloxane endblocked by trimethylsiloxy groups at both terminals and having a viscosity of 5,000 mPa·s (19%); a dimethylsiloxane methylphenylsiloxane copolymer endblocked by trimethylsiloxy groups at both terminals and having a viscosity of 150 mPa·s and containing 40 mol % methylphenylsiloxane unit (4%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.005 part of a platinum complex of chloroplatinic acid and divinyltetramethyldisiloxane wherein the platinum concentration in the platinum complex was 41 weight %; and 0.1 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 1.

TABLE 1

|  |  | Example 1 | Example 2 | Comparative Example 1 | Comparative Example 2 |
|---|---|---|---|---|---|
| composition number |  | 1 | 2 | 3 | 4 |
| liquid silicone rubber base |  | A | A | A | A |
| dimethylpolysiloxane (E) content | % | 24 | 26 | 15 | 19 |
| methylphenylpolysiloxane (F) content | % | 6 | 6 | 4 | 4 |
| hardness | Asker C | 42 | 43 | 59 | 50 |
|  | JIS A | 20 | 21 | 33 | 29 |
| tensile strength | MPa | 4.3 | 4.4 | 6.6 | 6.3 |
| elongation | % | 680 | 730 | 715 | 741 |
| tear strength | N/mm | 18 | 28 | 35 | 33 |
| tensile modulus (M100) | MPa | 0.44 | 0.44 | 0.84 | 0.65 |
| compression set | % | 26 | 28 |  |  |
| depth of scratching after the traverse/withdraw test |  |  |  |  |  |
| after 5 cycles | μm | 41 | 43 | 83 | 27 |
| after 10 cycles | μm | 60 | 71 | 245 | 93 |
| after 15 cycles | μm | 64 | 55 | 259 | 320 |
| after 20 cycles | μm | 57 | 50 | 283 | 264 |

Comparative Example 3

The following components were added to 144 parts of liquid silicone rubber base B and mixed therewith to uniformity to produce a hydrosilylation reaction-curable liquid silicone rubber composition designated as composition number 6:
a dimethylpolysiloxane endblocked by trimethylsiloxy groups at both terminals and having a viscosity of 5,000 mPa·s (6%); a dimethylsiloxane methylphenylsiloxane copolymer endblocked by trimethylsiloxy groups at both terminals and having a viscosity of 150 mPa·s and containing 40 mol % methylphenylsiloxane unit (7%); 1.8 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 2.2 parts of a dimethylpolysiloxane endblocked by dimethylhydrogensiloxy groups and having a viscosity of 11 mPa·s and a silicon-bonded hydrogen atom content of 0.15 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 2.

Comparative Example 4

The following components were added to 144 parts of liquid silicone rubber base B and mixed to uniformity therewith to produce a hydrosilylation reaction-curable liquid silicone rubber composition designated as composition number 7:
a dimethylpolysiloxane endblocked by trimethylsiloxy groups at both terminals and having a viscosity of 5,000 mPa·s (13%); a dimethylsiloxane.methylphenylsiloxane copolymer endblocked by trimethylsiloxy groups at both terminals and having a viscosity of 150 mPa·s and containing 40 mol % methylphenylsiloxane unit (7%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 2.

Example 3

The following components were added to 144 parts of liquid silicone rubber base B and mixed to uniformity therewith to produce a hydrosilylation reaction-curable liquid silicone rubber composition designated as composition number 8:
a dimethylpolysiloxane endblocked by trimethylsiloxy groups at both terminals and having a viscosity of 5,000 mPa·s (16%); a dimethylsiloxane.methylphenylsiloxane copolymer endblocked by trimethylsiloxy groups at both terminals and having a viscosity of 150 mPa·s and containing 40 mol % methylphenylsiloxane unit (7%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 2.

Example 4

The following components were added to 144 parts of liquid silicone rubber base B and mixed to uniformity to produce a hydrosilylation reaction-curable liquid silicone rubber composition designated as composition number 9:
a dimethylpolysiloxane endblocked by trimethylsiloxy groups at both terminals and having a viscosity of 5,000 mPa·s (19%); a dimethylsiloxane.methylphenylsiloxane copolymer endblocked by trimethylsiloxy groups at both terminals and having a viscosity of 150 mPa·s and containing 40 mol % methylphenylsiloxane unit (6%); 2.5 parts of a dimethylsiloxane methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 2.

TABLE 2

| | | Comparative Example 3 | Comparative Example 4 | Example 3 | Example 4 |
|---|---|---|---|---|---|
| composition number | | 6 | 7 | 8 | 9 |
| liquid silicone rubber base | | B | B | B | B |
| dimethylpolysiloxane (E) content | % | 6 | 13 | 16 | 19 |
| methylphenylpolysiloxane (F) content | % | 7 | 7 | 7 | 6 |
| hardness | Asker C | 50 | 50 | 49 | 46 |
| | JIS A | 25 | 28 | 25 | 23 |
| tensile strength | MPa | 5.9 | 7 | 6.4 | 5.3 |
| elongation | % | 822 | 768 | 779 | 748 |
| tear strength | N/mm | 31 | 37 | 38 | 30 |
| tensile modulus (M100) | MPa | 0.47 | 0.57 | 0.50 | 0.46 |
| compression set | % | | | | |
| depth of scratching after the traverse/withdraw test | | | | | |
| after 5 cycles | μm | 96 | 72 | 0 | 0 |
| after 10 cycles | μm | 141 | 293 | 0 | 0 |
| after 15 cycles | μm | 149 | 339 | 69 | 0 |
| after 20 cycles | μm | 195 | 296 | 83 | 91 |

Example 5

The following components were added to 144 parts of liquid silicone rubber base B and mixed therewith to uniformity to produce a hydrosilylation reaction-curable liquid silicone rubber composition designated as composition number 10:
a dimethylpolysiloxane endblocked by trimethylsiloxy groups at both terminals and having a viscosity of 5,000 mPa·s (23%); a dimethylsiloxane methylphenylsiloxane copolymer endblocked by trimethylsiloxy groups at both terminals and having a viscosity of 150 mPa·s and containing 40 mol % methylphenylsiloxane unit (6%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 3.

Example 6

The following components were added to 144 parts of liquid silicone rubber base B and mixed to uniformity therewith to produce a hydrosilylation reaction-curable liquid silicone rubber composition designated as composition number 11:
a dimethylpolysiloxane endblocked by trimethylsiloxy groups at both terminals and having a viscosity of 5,000 mPa·s (30%); a dimethylsiloxane.methylphenylsiloxane copolymer endblocked by trimethylsiloxy groups at both terminals and having a viscosity of 150 mPa·s and containing 40 mol % methylphenylsiloxane unit (6%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 3.

Comparative Example 5

The following components were added to 144 parts of liquid silicone rubber base B and mixed to uniformity therewith to produce a hydrosilylation reaction-curable liquid silicone rubber composition designated as composition number 12:
a dimethylpolysiloxane endblocked by trimethylsiloxy groups at both terminals and having a viscosity of 5,000 mPa·s (40%); a dimethylsiloxane.methylphenylsiloxane copolymer endblocked by trimethylsiloxy groups at both terminals and having a viscosity of 150 mPa·s and containing 40 mol % methylphenylsiloxane unit (5%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 3.

It can be judged from the value each of hardness, tensile strength and tensile stress at 100% elongation that this liquid silicone rubber composition will have poor molding properties and a silicone rubber sealing member molded from this liquid silicone rubber composition will not have satisfactory sealing performance or capability.

Comparative Example 6

The following components were added to 144 parts of liquid silicone rubber base B and mixed to uniformity to produce a hydrosilylation reaction-curable liquid silicone rubber composition designated as composition number 13:
a dimethylpolysiloxane endblocked by trimethylsiloxy groups at both terminals and having a viscosity of 5,000 mPa·s (60%); a dimethylsiloxane.methylphenylsiloxane copolymer endblocked by trimethylsiloxy groups at both terminals and having a viscosity of 150 mPa·s and containing 40 mol % methylphenylsiloxane unit (3%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 3.

It can be judged from the value each of hardness, tensile strength and tensile stress at 100% elongation that this liquid silicone rubber composition will have poor molding properties and a silicone rubber sealing member molded from this liquid silicone rubber composition will not have satisfactory sealing performance or capability.

Comparative Example 7

The following components were added to 150 parts of liquid silicone rubber base C and mixed to uniformity to produce a hydrosilylation reaction-curable liquid silicone rubber composition designated as composition number 14:
85 parts of a dimethylpolysiloxane endblocked at both terminals by dimethylvinylsiloxy groups and having a viscosity of 50,000 mPa·s and a vinyl group content of 0.08 weight %; a dimethylsiloxane.methylphenylsiloxane copolymer endblocked by trimethylsiloxy groups at both terminals and having a viscosity of 150 mPa·s and containing 40 mol % methylphenylsiloxane unit (6%); 1.7 parts of a dimethylsiloxane.methylhydrogensiloxane copolymer endblocked by trimethylsiloxy groups at both terminals and having a viscosity of 15 mPa·s and a silicon-bonded hydrogen atom content of 0.8 weight %; 2.6 parts of a dimethylpolysiloxane endblocked by dimethylhydrogensiloxy groups at both terminals and having a viscosity of 11 mPa·s and a silicon-bonded hydrogen atom content of 0.15 weight %; 0.006 part of a platinum complex of chloroplatinic acid and divinyltetramethyldisiloxane wherein the platinum concentration in the platinum complex was 41 weight %; and 0.1 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 3.

TABLE 3

|  |  | Example 5 | Example 6 | Comp. Example 5 | Comp. Example 6 | Comp. Example 7 |
|---|---|---|---|---|---|---|
| composition number |  | 10 | 11 | 12 | 13 | 14 |
| liquid silicone rubber base |  | B | B | B | B | C |
| dimethylpolysiloxane (E) content | % | 23 | 30 | 40 | 60 | 0 |
| methylphenylpolysiloxane (F) content | % | 6 | 6 | 5 | 3 | 6 |
| hardness | Asker C | 45 | 35 | 30 | 10 | 40 |
|  | JIS A | 22 | 16 | 9 | 1.8 | 19 |
| tensile strength | MPa | 5 | 3 | 2.6 | 0.9 | 5.9 |
| elongation | % | 700 | 598 | 703 | 554 | 850 |
| tear strength | N/mm | 38 | 10.3 | 5.8 | 1.97 | 20 |

TABLE 3-continued

|  |  | Example 5 | Example 6 | Comp. Example 5 | Comp. Example 6 | Comp. Example 7 |
|---|---|---|---|---|---|---|
| tensile modulus (M100) | MPa | 0.48 | 0.29 | 0.21 | 0.07 | 0.34 |
| compression set | % | 30 |  |  |  |  |
| depth of scratching after the traverse/withdraw test |  |  |  |  |  |  |
| after 5 cycles | μm | 13 | 0 | 0 | 0 | 14 |
| after 10 cycles | μm | 64 | 0 | 0 | 75 | 263 |
| after 15 cycles | μm | 59 | 0 | 0 | 0 | 341 |
| after 20 cycles | μm | 61 | 91 | 0 | 0 | 343 |

Example 7

The following components were added to 144 parts of liquid silicone rubber base B and mixed to uniformity therewith to produce a hydrosilylation reaction-curable liquid silicone rubber composition designated as composition number 15: a dimethylpolysiloxane endblocked by trimethylsiloxy groups at both terminals and having a viscosity of 50 mPa·s (30%); a dimethylsiloxane.methylphenylsiloxane copolymer endblocked by trimethylsiloxy groups at both terminals and having a viscosity of 150 mPa·s and containing 40 mol % methylphenylsiloxane unit (6%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 4.

Example 8

The following components were added to 144 parts of liquid silicone rubber base B and mixed to uniformity therewith to produce a hydrosilylation reaction-curable liquid silicone rubber composition designated as composition number 16: a dimethylpolysiloxane endblocked by trimethylsiloxy groups at both terminals and having a viscosity of 100,000 mPa·s (30%); a dimethylsiloxane.methylphenylsiloxane copolymer endblocked by trimethylsiloxy groups at both terminals and having a viscosity of 150 mPa·s and containing 40 mol % methylphenylsiloxane unit (6%); 2.5 parts of a dimethylsiloxane.methylhydrogensiloxane copolymer endblocked by trimethylsiloxy groups at both terminals and having a viscosity of 52 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 4.

Comparative Example 8

The following components were added to 144 parts of liquid silicone rubber base B and mixed to uniformity therewith to produce a hydrosilylation reaction-curable liquid silicone rubber composition designated as composition number 17: a dimethylpolysiloxane endblocked by trimethylsiloxy groups at both terminals and having a viscosity of 5,000 mPa·s (30%); 2.5 parts of a dimethylsiloxane.methylhydrogensiloxane copolymer endblocked by trimethylsiloxy groups at both terminals and having a viscosity of 150 mPa·s and a silicon-bonded hydrogen atom content of 0.5 weight %; 0.0045 part of a platinum complex of chloroplatinic acid and divinyltetramethyldisiloxane wherein the platinum concentration in the platinum complex was 41 weight %; and 0.09 part of 1-ethynyl-1-cyclohexanol added as a hydrosilylation reaction inhibitor.

This hydrosilylation reaction-curable liquid silicone rubber composition was submitted to measurement of the properties referenced above, and the results of these measurements are given in Table 4.

The silicone rubber sealing member molded from this liquid silicone rubber composition was very tacky and it thus had poor handling characteristics. The surface of the molding had to be covered with a plastic film or sprinkled with talc when the traverse/withdraw test was performed. The operability during insertion and withdrawal of the hollow square column for the traverse/withdraw test was also poor.

TABLE 4

|  |  | Example 7 | Example 8 | Comparative Example 8 |
|---|---|---|---|---|
| composition number |  | 15 | 16 | 17 |
| liquid silicone rubber base |  | B | B | B |
| dimethylpolysiloxane (E) content | % | 30 | 30 | 30 |
| methylphenylpolysiloxane (F) content | % | 6 | 6 | 0 |
| hardness | Asker C | 36 | 35 | 39 |
|  | JIS A | 16 | 15 | 18 |
| tensile strength | MPa | 3.4 | 4.1 | 5.4 |
| elongation | % | 646 | 744 | 768 |
| tear strength | N/mm | 11 | 13 | 33 |
| tensile modulus (M100) | MPa | 0.31 | 0.30 | 0.38 |
| compression set | % |  |  |  |
| depth of scratching after the traverse/withdraw test |  |  |  |  |
| after 5 cycles | μm | 0 | 0 | 0 |
| after 10 cycles | μm | 0 | 0 | 0 |
| after 15 cycles | μm | 0 | 0 | 27 |
| after 20 cycles | μm | 0 | 61 | 160 |

INDUSTRIAL APPLICABILITY

The curable liquid silicone rubber composition of the present invention for forming a through hole-containing sealing member is useful for producing a through hole-containing sealing member.

The through hole-containing sealing member of the present invention is useful for preventing the infiltration of, water, dust, contaminated air and so on, while metal wire, rubber-coated metal wire, plastic-coated metal wire etc. is inserted in the through hole.

DESCRIPTION OF THE REFERENCE SYMBOLS

1: silicone rubber sealing member
2: through hole
3: hollow square column
4: metal bar

The invention claimed is:

1. A curable liquid silicone rubber composition for forming a through hole-containing sealing member, the composition comprising:
   (A) 100 weight parts of a liquid organopolysiloxane that is represented by the average unit formula: $R_aSiO_{(4-a)/2}$ wherein R is an unsubstituted monovalent hydrocarbyl group or a halogenated monovalent hydrocarbyl group and a is 1.95 to 2.05, that contains at least two silicon-bonded alkenyl groups in each molecule, and that has a viscosity at 25° C. of 100 to 100,000 mPa·s;
   (B) 10 to 100 weight parts of a reinforcing silica filler;
   (C) an organohydrogenpolysiloxane that has at least two hydrosilyl groups in each molecule, in an amount that provides (1.0:1) to (3.0:1) for the ratio between the number of moles of hydrosilyl groups in this component and the number of moles of alkenyl groups in component (A);
   (D) a platinum group catalyst, in a catalytic amount;
   (E) a liquid organopolysiloxane that does not contain an aliphatically unsaturated group, hydrosilyl group, and silanol group, that has a viscosity at 25° C. of 10 to 500,000 mPa·s, and that is compatible with component (A), in an amount that is 15 to 31 weight % of the total of components (A) to (F); and
   (F) a liquid organopolysiloxane that does not contain an aliphatically unsaturated group, hydrosilyl group, and silanol group, that has a viscosity at 25° C. of 10 to 500,000 mPa·s, and that is incompatible with component (A), in an amount that is 1.0 to 10 weight % of the total of components (A) to (F),
   wherein the cured material therefrom has a hardness, measured using a type A durometer according to JIS K 6253, "Hardness Test Method for Vulcanized Rubbers", of 15 to 26 and has a tensile stress at 100% elongation, measured according to JIS K 6251, "Vulcanized Rubbers and Thermoplastic Rubbers—Determination of Tensile Properties", of 0.25 to 0.60 MPa.

2. The curable liquid silicone rubber composition for forming a through hole-containing sealing member according to claim 1, wherein the composition comprises a liquid silicone rubber base provided by mixing 100 weight parts of component (A) with 10 to 100 weight parts of component (B) with the application of heat, and components (C), (D), (E), and (F).

3. The curable liquid silicone rubber composition for forming a through hole-containing sealing member according to claim 1, wherein the composition comprises a liquid silicone rubber base provided by mixing (100-X) weight parts of component (A) with 10 to 100 weight parts of component (B) with the application of heat, X weight parts of component (A), and components (C), (D), (E), and (F), wherein X is from 0 (but not including 0) to 30.

4. The curable liquid silicone rubber composition for forming a through hole-containing sealing member according to claim 1, wherein the non-alkenyl silicon-bonded groups in the organopolysiloxane (A) are methyl groups, the silicon-bonded groups other than silicon-bonded hydrogen atoms in the organohydrogenpolysiloxane (C) are methyl groups, the organopolysiloxane (E) is a dimethylpolysiloxane, and the silicon-bonded groups in the organopolysiloxane (F) are methyl groups and phenyl groups.

5. The curable liquid silicone rubber composition for forming a through hole-containing sealing member according to claim 1, wherein the silicone rubber has a tensile strength of at least 2.8 MPa and an elongation of at least 500% in each case as measured according to JIS K 6251, "Tensile Test Methods for Vulcanized Rubbers".

6. A through hole-containing sealing member, comprising a silicone rubber provided by curing a curable liquid silicone rubber composition comprising
   (A) 100 weight parts of a liquid organopolysiloxane that is represented by the average unit formula: $R_aSiO_{(4-a)/2}$ wherein R is an unsubstituted monovalent hydrocarbyl group or a halogenated monovalent hydrocarbyl group and a is 1.95 to 2.05, that contains at least two silicon-bonded alkenyl groups in each molecule, and that has a viscosity at 25° C. of 100 to 100,000 mPa·s;
   (B) 10 to 100 weight parts of a reinforcing silica filler;
   (C) an organohydrogenpolysiloxane that has at least two hydrosilyl groups in each molecule, in an amount that provides (1.0:1) to (3.0:1) for the ratio between the number of moles of hydrosilyl groups in this component and the number of moles of alkenyl groups in component (A);
   (D) a platinum group catalyst, in a catalytic amount;
   (E) a liquid organopolysiloxane that does not contain an aliphatically unsaturated group, hydrosilyl group, and silanol group, that has a viscosity at 25° C. of 10 to 100,000 mPa·s, and that is compatible with component (A), in an amount that is 15 to 31 weight % of the total of components (A) to (F); and
   (F) a liquid organopolysiloxane that does not contain an aliphatically unsaturated group, hydrosilyl group, and silanol group, that has a viscosity at 25° C. of 10 to 100,000 mPa·s, and that is incompatible with component (A), in an amount that is 1.0 to 10 weight % of the total of components (A) to (F),
   wherein the silicone rubber has a hardness, measured using a type A durometer according to JIS K 6253, "Hardness Test Method for Vulcanized Rubbers", of 15 to 26 and has a tensile stress at 100% elongation, measured according to JIS K 6251, "Vulcanized Rubbers and Thermoplastic Rubbers—Determination of Tensile Properties", of 0.25 to 0.60 MPa.

7. The through hole-containing sealing member according to claim 6, wherein the composition comprises a liquid silicone rubber base provided by mixing 100 weight parts of component (A) with 10 to 100 weight parts of component (B) with the application of heat, and components (C), (D), (E), and (F).

8. The through hole-containing sealing member according to claim 6, wherein the composition comprises a liquid silicone rubber base provided by mixing (100-X) weight parts of component (A) with 10 to 100 weight parts of component (B)

with the application of heat, X weight parts of component (A), and components (C), (D), (E), and (F), wherein X is from 0 (but not including 0) to 30.

9. The through hole-containing sealing member according to claim 6, wherein the non-alkenyl silicon-bonded groups in the organopolysiloxane (A) are methyl groups, the silicon-bonded groups other than silicon-bonded hydrogen atoms in the organohydrogenpolysiloxane (C) are methyl groups, the organopolysiloxane (E) is a dimethylpolysiloxane, and the silicon-bonded groups in the organopolysiloxane (F) are methyl groups and phenyl groups.

10. The through hole-containing sealing member according to claim 6, wherein the silicone rubber has a tensile strength of at least 2.8 MPa and an elongation of at least 500% in each case as measured according to JIS K 6251, "Tensile Test Methods for Vulcanized Rubbers".

11. A method of manufacturing the through hole-containing sealing member according to claim 6, wherein the liquid silicone rubber composition is filled into a metal mold having a cavity and having at least one pin in the cavity thickness direction, the metal mold is hot pressed, and the resulting through hole-containing sealing member made of a silicone rubber is taken out from the metal mold.

12. The curable liquid silicone rubber composition for forming a through hole containing sealing member according to claim 2, wherein the non-alkenyl silicon-bonded groups in the organopolysiloxane (A) are methyl groups, the silicon-bonded groups other than silicon-bonded hydrogen atoms in the organohydrogenpolysiloxane (C) are methyl groups, the organopolysiloxane (E) is a dimethylpolysiloxane, and the silicon-bonded groups in the organopolysiloxane (F) are methyl groups and phenyl groups.

13. The curable liquid silicone rubber composition for forming a through hole containing sealing member according to claim 3, wherein the non-alkenyl silicon-bonded groups in the organopolysiloxane (A) are methyl groups, the silicon-bonded groups other than silicon-bonded hydrogen atoms in the organohydrogenpolysiloxane (C) are methyl groups, the organopolysiloxane (E) is a dimethylpolysiloxane, and the silicon-bonded groups in the organopolysiloxane (F) are methyl groups and phenyl groups.

14. The curable liquid silicone rubber composition for forming a through hole-containing sealing member according to claim 2, wherein the silicone rubber has a tensile strength of at least 2.8 MPa and an elongation of at least 500% in each case as measured according to JIS K 6251, "Tensile Test Methods for Vulcanized Rubbers".

15. The curable liquid silicone rubber composition for forming a through hole containing sealing member according to claim 3, wherein the silicone rubber has a tensile strength of at least 2.8 MPa and an elongation of at least 500% in each case as measured according to JIS K 6251, "Tensile Test Methods for Vulcanized Rubbers".

* * * * *